United States Patent
Kim

(10) Patent No.: US 6,463,259 B1
(45) Date of Patent: Oct. 8, 2002

(54) MOBILITY PROCESSING METHOD OVER ACCESS INTERFACE V5.2 PROTOCOL

(75) Inventor: Young-Hwa Kim, Kunpo (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/348,633

(22) Filed: Jul. 6, 1999

(30) Foreign Application Priority Data

Sep. 18, 1998 (KR) .............................. 98-38774

(51) Int. Cl.⁷ ................................................. H04H 1/00
(52) U.S. Cl. ........................ 455/3.01; 455/435; 455/445
(58) Field of Search ................................. 455/435, 3.01, 455/433, 445

(56) References Cited

U.S. PATENT DOCUMENTS

| 5,781,623 A | 7/1998 | Khakzar | 379/230 |
| 6,278,700 B1 | 8/2001 | Haster | 370/329 |

FOREIGN PATENT DOCUMENTS

WO  WO-98/36602  * 8/1998 ............. H04Q/7/38

* cited by examiner

*Primary Examiner*—Lee Nguyen
(74) *Attorney, Agent, or Firm*—Fleshner & Kim, LLP

(57) ABSTRACT

A mobility processing method using a V5.2 protocol performs a mobility processing of a terminal by adding a mobility-related protocol to the V5.2 protocol. The mobility processing method using a V5.2 protocol in an exchanging system which employs a V5.2 protocol as a standard, consisting of an access network which exchanges data with a plurality of users and a local exchange which exchanges data with the access network, includes: defining a predetermined additional message for registration, whereby port assignment and port cancel of a mobile user is defined in the V5.2 protocol of the access network and the local exchange; and defining a mobility-related protocol state, a mobility-related control protocol state and a mobility-related PSTN (public switched telephone network) protocol state of the V5.2 protocol, in accordance with the additional message, thereby processing the mobility of the user.

27 Claims, 5 Drawing Sheets

| FE | FE NAME | AN <-> LE | MDU NAME | PSM <-> LE MANAGEMENT |
|---|---|---|---|---|
| FE501 | REGISTRATION REQUEST | -> | MDU_RRQ | -> |
| FE502 | REGISTRATION ACCEPT | <- | MDU_RAC | <- |
| FE503 | REGISTRATION REJECT | <- | MDU_RRJ | <- |
| FE504 | PORT ASSIGN | <- | MDU_ASN | <- |
| FE505 | PORT ASSIGN ACK | -> | MDU_ASK | -> |
| FE506 | PORT CANCEL | <- | MDU_PCN | <- |
| FE507 | PORT CANCEL ACK | -> | MDU_PCK | -> |

FIG. 3

| STATE<br>EVENT / STATE NAME | LE1.0<br>PORT NOT ASSIGNED | LE1.1<br>LOCAL ASSIGN | LE1.2<br>REMOTE ASSIGN | LE2.0<br>PORT ASSIGNED |
|---|---|---|---|---|
| FE501 | LE1.2<br>MDU_RRQ | / | – | MDU_RRQ |
| MDU_RAC | / | / | LE1.1<br>FE502 | FE502 |
| MDU_RRJ | – | / | LE1.0<br>FE503 | FE503 |
| MDU_ASN | – | FE504 | / | / |
| FE505 | / | LE2.0<br>MDU_ASK | / | – |
| FE507 | – | / | / | / |
| MDU_PCN | – | LE1.0<br>FE506 | LE1.0<br>FE506 | LE1.0<br>FE506 |

FIG. 4

| STATE<br>EVENT / STATE NAME | LE1.0<br>PORT BLOCKED | LE1.1<br>LOCAL UNBLOCK | LE1.2<br>REMOTE UNBLOCK | LE2.0<br>OPERATIONAL |
|---|---|---|---|---|
| RDGISTRATION ACCEPT | LE2.0 | LE2.0 | LE2.0 | |
| PORT ASSIGN ACK | LE2.0 | LE2.0 | LE2.0 | |
| PORT CANCEL | | LE1.0 | LE1.0 | LE1.0 |

FIG. 5

| STATE<br>EVENT | LE0 | LE1 | LE2 | LE3 | LE4 | LE5 | LE6 |
|---|---|---|---|---|---|---|---|
| STATE NAME | OUT OF SEVICE | NULL | PATH INITIATED BY LE | PATH INITIATED BY AN | PATH ACTIVE | PATH DISCONNECT REQUEST | PORT BLOCKED |
| RDGISTRATION ACCEPT | | | | | | | LE1 |
| PORT ASSIGN ACK | | LE6 | LE6 | LE6 | LE6 | LE6 | LE1 |
| PORT CANCEL | | | | | | | |

MOBILITY PROCESSING METHOD OVER ACCESS INTERFACE V5.2 PROTOCOL

BACKGROUND OF THE INVENTION

1. Field of the Invention

The present invention relates to a V5.2 protocol, and more particularly to a mobility processing method using a V5.2 protocol that performs a mobility processing of a terminal by adding a mobility-related protocol to the V5.2 protocol.

2. Description of the Conventional Art

Generally, a V5.2 protocol produced by ETSI 300 347-1 of ISO, ITU-T G.965 provides various services for analog ordinary and public telephones, ISDN(integrated services digital network) BRA(basic rate access) connection which observes ITU-T G.960 and I.430, ISDN PRA(primary rate access) connection that observes ITU-T G.692 and I.431, and analog or digital dedicated line connection.

As shown in FIG. 1, the V5.2 protocol is an interface standard for supplying various services between an access Network (AN) and a local exchange (LE). The V5.2 protocol can be divided into a public switched telephone network (PSTN) protocol, a control protocol, a link control protocol, a bearer channel connection (BCC) protocol, and a protection protocol.

More specifically, in the PSTN protocol, the AN transmits analog information through a V5.2 interface to a protocol entity of the LE without controlling a call processing. The control protocol has a user port control function and a general control function. The user port control function defines a state of an ISDN/PSTN user port and prescribes activation and deactivation of a ISDN port, and blocking and unblocking thereof, and the general control function prescribes resetting of a provision data set and synchronization and verification of a new provision data set. The link control protocol identifies a physical layer and a state of 2048 kbps links thereof, manages and blocks the links, unblocks the mutually adjusted links verifies link continuity and mutually adjusts a link control function. The BCC protocol provides a means for requesting the AN to set or cancel a connection between a specific user port of the AN and a V5.2 interface time slot in a call unit. The protection protocol prevents services from being suspended due to obstruction to a communication path, because one V5.2 interface manages a plurality of links and converts a logic C-channel (communication channel) to another physical C-channel using a switching means for protecting the C-channel.

However, since the conventional V5.2 protocol recommendation which is made only for users who are directly connected to a system does not recommend substance of the terminal mobility. In reality, a WLL (wireless local loop) system which has been developing under the standard of the V5.2 protocol receives user's connection requests by wireless methods and companies that engage in the WLL business have requested terminal mobility processing that is provided by existing wireless services such as DCN, PCS to make up for the weakness of the wireless system. However, since no V5.2 protocol has the terminal mobility processing function, it is currently required to have a separate standard to perform such a function.

In other words, since the conventional V5.2 protocol was developed for the users who are only directly connected to the AN, it is impossible to perform the mobility processing of mobile users and thus provide a service therefor.

SUMMARY OF THE INVENTION

Accordingly, the present invention is directed to a mobility processing method using a V5.2 protocol which obviates the problems and disadvantages in the conventional art.

An object of the present invention is to provide a mobility processing method using a V5.2 protocol that performs a mobility processing of a terminal by adding a mobility-related protocol to the V5.2 protocol.

To achieve these and other advantages and in accordance with the purpose of the present invention, as embodied and broadly described herein, there is provided a mobility processing method using a V5.2 protocol in a communication system, which employs a V5.2 protocol as a standard, consisting of an access network which exchanges data with a plurality of users and a local exchange which exchanges data with the access network, which includes: defining a predetermined additional message for registration, whereby port assignment and port cancel of a mobile user is defined in the V5.2 protocol of the access network and the local exchange; and defining a mobility-related protocol state, a mobility-related control protocol state and a mobility-related PSTN (public switched telephone network) protocol state of the V5.2 protocol, in accordance with the additional message, thereby processing the mobility of the user.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a table illustrating a mobility-related protocol state definition according to the embodiment of the present invention;

FIG. 4 is a table illustrating a mobility-related control protocol state definition according to the embodiment of the present invention;

FIG. 5 is a table illustrating a mobility-related PSTM protocol state definition according to the embodiment of the present invention;

DETAILED DESCRIPTION OF THE INVENTION

Reference will now be made in detail to the preferred embodiment of the present invention, examples of which are illustrated in the accompanying drawings.

To provide a V5.2 protocol for a mobility processing of a terminal according to the present invention, a mobility-related protocol stack must be additionally provided, which is divided into a stack which defines a state and a message procedure of a mobility-related protocol, a stack which defines a state of a mobility-related control protocol and a stack which defines a state of a mobility-related PSTN protocol.

Figures 1, 2:
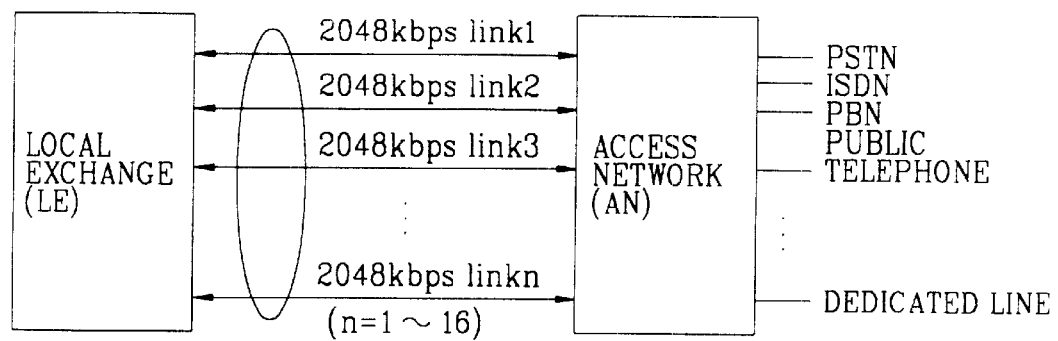
FIG. 1 is a diagram illustrating a V5.2 interface between a local exchange and an access network.
FIG. 2 is a table illustrating a primitive definition of a mobility-related protocol according to an embodiment of the present invention.

Particularly, the mobility-related protocol stack defines a mobility-related message as a registration request message (Registration Request) made by the AN for requesting registration of a user, a registration accept message (Registration Accept) which is a reply of the LE to the registration request, a registration reject message (Registration Reject) for rejecting the registration request, a port assign message (Port Assign) for which the LE assigns a specific port in accordance with the registration of the user, a port assign acknowledge message (Port Assign Ack) which is a reply of the AN to the port assign message, a port cancel message (Port Cancel) for which the LE cancels a previously assigned port in accordance with registration cancel of the user, and a port cancel acknowledge message (Port Cancel Ack) which is a reply of the AN to the port cancel message, and accordingly a mobility-related primitive definition is stored as an identification value of a message transmitted between the AN and the LE and an identification value of a message of a system management which is internally used in the LE. For example, the mobility-related primitive definition can be shown as in FIG. 2, wherein 'FE(function element)xxx' is the identification value of the message transmitted between the AN and the LE and 'MDU_xxx' is the identification value of the message of the system management which is internally used in the LE.

As mentioned above, the mobility-related message is defined and the stack defining the state of the mobility-related protocol is additionally provided. The mobility-related protocol stack processes the registration and the assignment messages of the AN, reports a result to the system management, performs registration and cancelling of the user being interlocked to a call controlling block by the system management, and then manages the states related to the PSTN and control protocol stacks.

FIG. 3 is a table illustrating a mobility-related protocol state definition according to the embodiment of the present invention, wherein input messages are shown in the leftmost column and states located at the top row indicate present states of a protocol stack.

As shown therein, 'LE1.0' is a state in which no port is assigned for the mobility and a call is not yet set in such a state, 'LE1.1' is a transient state when the LE starts the port assignment procedure, 'LE1.2' is a transient state when the AN starts the port assignment procedure and 'LE2.0' is a state where a port is assigned so that the call can be processed, and further the port can be processed.

For instance, when the AN receives a registration request message (FE501), the protocol stack reports 'MDU_RRQ' to an upper layer and transits to 'LE1.2'. When receiving registration permission from the upper layer, the protocol stack transmits 'FE502' to the AN and transits to 'LE1.1'. And, when receiving 'MDUASN' from the upper level, the protocol stack transmits 'FE504' to the AN. While, when receiving 'FE505' from the AN, the protocol stack becomes 'LE2.0', which is the port assignment state, in which the call can be processed.

FIG. 4 is a table illustrating a mobility-related control protocol state definition according to the embodiment of the present invention.

A message processed result of the above-mentioned mobility-related protocol stack is reflected in the state of the control protocol stack as shown in FIG. 4. Here, the processing of the registration is linked with a block or unblock state of the control port. In FIG. 4, messages from an upper management are shown in the leftmost column and states located at the top row indicate present states of the control protocol stack, wherein 'LE1.0' is a state that the ports are blocked, 'LE1.1' is a state that the port of the LE is unblocked, 'LE1.2' is a state that the port of the AN is unblocked and 'LE2.0' is a state that the ports are available.

Here, since a call can not be processed when the port is not in 'LE2.0', when the port is assigned in the mobility processing, the control protocol should be informed that the corresponding port is available. Further, even in the state where the port is not in 'LE1.0', when the port is cancelled in the mobility-related processing, the port should transit to 'LE1.0', so that the control protocol may identify that the corresponding port is not in use.

For example, the mobile user is in a port assigned state LE2.0 when transmitting 'registration accept' to a control port FSM (finite state machine). The port transits to 'LE2.0' when receiving 'port assign ack' and unconditionally transits to 'LE1.0' wherein the port can not be used when receiving 'port cancel'.

FIG. 5 is a table illustrating a mobility-related PSTN protocol state definition according to the embodiment of the present invention. A message processed result of the above-mentioned mobility-related protocol stack is reflected in the state of the PSTN protocol stack as shown in FIG. 5. Here, the processing of the user registration is associated with a block or unblock state of the PSTN port. In FIG. 5, messages from the system management are shown in the leftmost column and states located at the top row indicate states of the PSTN protocol stack, wherein 'LE0' is an interface initial state, 'LE1' is a state that a call can be set, 'LE2' is a state that a call is set by the LE, 'LE3' is a state that a call is set by the AN, 'LE4' is a call processing state, 'LE5' is a call cancel state and 'LE6' is a port blocking state.

More specifically, when a port is assigned in the mobility-related processing, irrespectively of 'LE1' to 'LE5' since the port has been already assigned, 'LE6' should transit to 'LE1' where the port is available, and when the port is cancelled, the port should be 'LE6', thus being identified as a port unavailable state. For example, when transmitting 'registration accept' to a PSTN port FSM, the mobile user is in a 'port assigned' state. When receiving 'port assign ack', the port transits to the port available state, that is, 'LE1' and when receiving a 'port cancel' message, the port unconditionally transits to the port unavailable state 'LE6'.

A mobility processing for the mobile user between the AN and the LE using the V5.2 protocol to which the stack defining the mobility-related protocol state, the mobility-related control protocol state and the mobility-related PSTN protocol state which are above mentioned are additionally provided will now be described.

Figure 6:
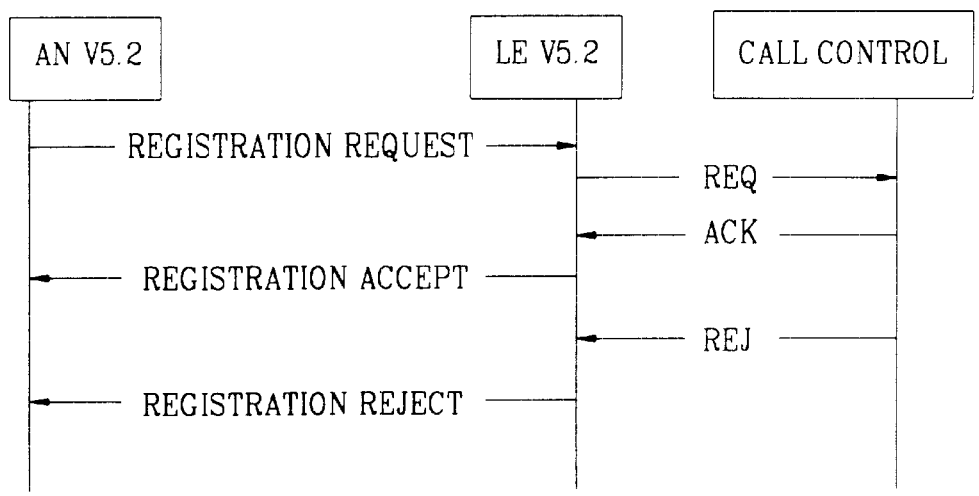
FIG. 6 is a diagram illustrating a registration procedure of a mobile user according to the embodiment of the present invention.

FIG. 6 is a diagram illustrating a registration procedure of the mobile user according to the embodiment of the present invention. When there is a registration request from the mobile user, a V5.2 protocol block of the AN (AN V5.2) makes a request for registration to an exchange. A V5.2 protocol entity (LE V5.2) of the exchange reports the registration request (REQ) to a mobility-related call control software block (Call Control), which returns a resultant value (ACK or REJ) to the V5.2 protocol block LE V5.2. Then, the V5.2 protocol block LE V5.2 of the exchange transmits a registration accept message (Registration Accept) or a registration reject message (Registration Reject) for the corresponding mobile user to the AN in accordance with the resultant value (ACK or REJ).

Figure 7:
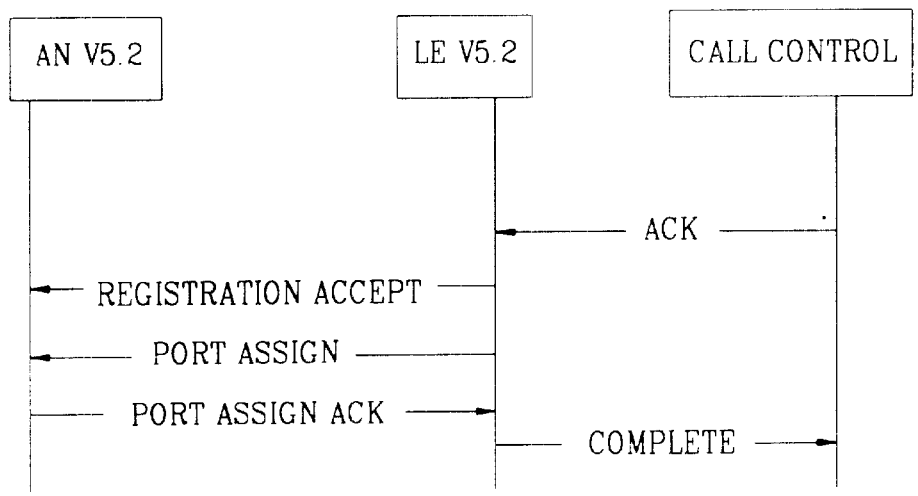
FIG. 7 is a diagram illustrating a port assignment registration procedure of a mobile user according to the embodiment of the present invention.

Further, a port assignment procedure of the mobile user according to the embodiment of the present invention will be described with reference to FIG. 7.

The user port assignment processing is linked with the registration of the mobile user. Here, when the user shifts its position and then registers, the AN makes a registration request and the call control block returns a positive acknowledge message (ACK) which is the resultant value to the V5.2 protocol block LE V5.2 of the exchange. Thus, the V5.2 protocol block LE V5.2 of the exchange transmits to the AN a registration accept message (Registration Accept) indicating that the registration of the corresponding mobile user has been completed. When the registration is completed, the LE assigns a predetermined available port and transmits a port assignment message (Port Assign) with respect to the corresponding port to the AN, which whereby transmits a port assign acknowledge message (Port Assign Ack) in response to the port assignment message to the LE. Accordingly, the V5.2 protocol block LE V5.2 of the LE transmits a complete message (Complete) to the call control block, which indicates that the port assignment for the mobile user has been completed, so that the mobile user may process a port number of the predetermined assigned port.

Figure 8:
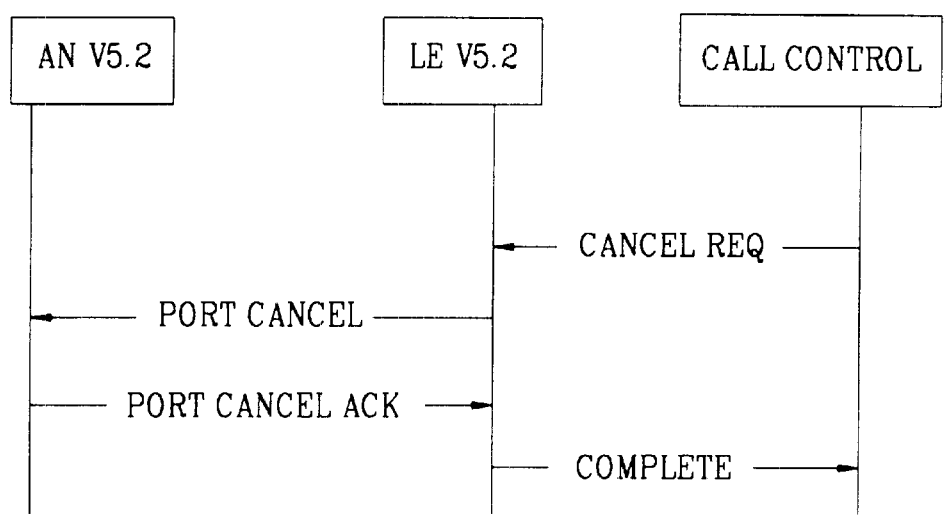
FIG. 8 is a diagram illustrating a port cancel procedure of a mobile user according to the embodiment of the present invention.

FIG. 8 is a diagram illustrating a port cancel procedure of the mobile user according to the embodiment of the present invention. The user port cancel processing is associated with the registration of the mobile user. Here, when the user shifts its position, to cancel the port which exists for the mobile user the call control block transmits a port cancel request message (Cancel Req) to the exchange V5.2 protocol block LE V5.2, which transmits a port cancel message (Port Cancel) to the AN. Thus, the AN transmits a port cancel acknowledge message with respect to the port cancel message to the LE. The V5.2 protocol block of the LE transmits a complete message (Complete) indicating that the port cancelling process to the mobile user has been completed to the call control block, so that the port for the mobile user is cancelled.

As described above, the mobility processing method using the V5.2 protocol according to the present invention additionally provides the mobility-related protocol which is capable of performing the mobility processing for the mobile user for the wireless switching system, such as WLL, in which the V5.2 protocol is used as the standard, thereby having an effect of supplying the service related to the mobility for the users.

It will be apparent to those skilled in the art that various modifications and variations can be made in the mobility processing method using the V5.2 protocol of the present invention without departing from the spirit or scope of the invention. Thus, it is intended that the present invention cover the modifications and variations of this invention provided they come within the scope of the appended claims and their equivalents.

What is claimed is:

1. A mobility processing method using a V5.2 protocol in a communication system, which employs a V5.2 protocol having a V5.2 protocol stack as a standard, and which includes an access network which exchanges data with a plurality of users and a local exchange which exchanges data with the access network, comprising:

defining, in both the access network and the local exchange, an extended protocol stack to augment the V5.2 protocol stack to include messages for location registration, port assignment, and port cancellation of a mobile user in accordance with the V5.2 protocol of the access network and the local exchange; and defining in the protocol stack mobility-related protocol states, mobility-related control protocol states, and mobility-related PSTN (public switched telephone network) protocol states of the V5.2 protocol, in accordance with states assumed by the protocol stack in response to the defined messages.

2. The mobility processing method according to claim 1, wherein the access network transmits a first additional message to the local exchange to register the mobile user.

3. The mobility processing method according to claim 2, wherein in response to the first additional message, the local exchange transmits one of a second additional message to accept the registration of the mobile user and a third additional message to reject the registration to the access network.

4. The mobility processing method according to claim 1, wherein the local exchange transmits an assignment message to the access network to assign a prescribed port to the registered mobile user.

5. The mobility processing method according to claim 4, wherein the access network transmits a confirmation message to the local exchange in response to the assignment message to indicate that the port assignment has been completed.

6. The mobility processing method according to claim 1, wherein the local exchange transmits a cancellation message to the access network to cancel the port which has been previously assigned to the mobile user.

7. The mobility processing method according to claim 6, wherein the access network transmits an acknowledgment message to the local exchange in response to the cancellation message which acknowledges the port cancellation.

8. The mobility processing method according to claim 1, wherein the mobility-related protocol state of the V5.2 protocol is defined as a first state that a port is not assigned, a second state that the local exchange starts the port assignment, a third state that the access network starts the port assignment, and a fourth state that the port assignment, is completed and a call can be processed, and wherein the state thereof is changed in accordance with an inputted additional message.

9. The mobility processing method according to claim 1, wherein the mobility-related control protocol state of the V5.2 protocol is defined as a first state that a port is blocked, a second state that a port of the local exchange is unblocked, a third state that a port of the access network is unblocked, and a fourth state that the port is available, and the state thereof is changed in accordance with an inputted additional message.

10. The mobility processing method according to claim 9, wherein when a port assignment confirmation message is transmitted from the access network, the mobility-related control protocol transitions to the fourth state that the port is available, and when a cancellation message is transmitted from the local exchange, the mobility-related control protocol transitions to the first state that the port is not available.

11. The mobility processing method according to claim 1, wherein the mobility-related PSTN protocol state of the V5.2 protocol is defined as a first state which is an interface initial state, a second state that a call can be set, a third state that a call is set by the local exchange, a fourth state that a call is set by the access network, a fifth state that is a call processing state, a sixth state that is a call cancel state, and a seventh state that is a port blocking state, and wherein the state is changed in accordance with an inputted additional message of the augmented protocol stack.

12. The mobility processing method according to claim 11, wherein when an assignment confirmation message is transmitted from the access network, the mobility-related PSTN protocol transitions to the second state that the call can be set, and when a cancellation message is transmitted from the local exchange, the mobility-related PSTN protocol transitions to the seventh state that the port is not available.

13. A mobility processing method in a communication system, which employs a V5.2 protocol as a standard, consisting of an access network which exchanges data with a plurality of users and a local exchange which exchanges data with the access network, the improved mobility processing method using a V5.2 protocol, comprising:

registering a registration request of a mobile user using a mobility-related protocol stack;

processing a call by assigning a prescribed port to the registered mobile user; and cancelling the registration of the assigned port to the mobile user, wherein registering the registration request comprises transmitting a registration request message from the access network to the local exchange when a new registration request is made by the mobile user, reporting the registration request of the mobile user from a V5.2 protocol block of the local exchange to a call control block, returning a processed result of the registration request from the call control block to the V5.2 protocol block of the local exchange, and transmitting one of a registration accepting message and a registration rejecting message with respect to the mobile user to the access network in accordance with the processed result transmitted from the call control block.

14. The mobility processing method according to claim 13, wherein processing the call further comprises:

assigning an available port by the local exchange and transmitting a port assignment message to the access network when the registration of the mobile user is completed;

transmitting an acknowledge message from the access network to the local exchange in response to the port assignment message; and transmitting a port assignment complete message from a V5.2 protocol block of the local exchange to a call control block.

15. The mobility processing method according to claim 13, wherein cancelling the registration further comprises:

transmitting a port cancel request message from a call control block to a V5.2 protocol block of the local exchange when the mobile user shifts to another access network or local exchange;

transmitting a port cancel message from the V5.2 protocol of the local exchange to the access network;

transmitting a port cancel acknowledge message from the access network to the local exchange with respect to the port cancel message; and transmitting a port cancel complete message from the V5.2 protocol block of the local exchange to the call control block to cancel the registration of the mobile user.

16. The method of claim 13, wherein the mobility-related protocol stack augments a standard V5.2 protocol stack.

17. The method of claim 16, wherein the mobility-related protocol stack is defined in each of the access network and the local exchange.

18. A method of accommodating mobility processing in a communications network employing an access network and a local exchange having a call management module, the access network and the local exchange interfaced using a V5.2 protocol, comprising:

defining, in a protocol stack augmenting the V5.2 protocol, mobility-related messages for location registration, port assignment, and port cancellation of a mobile terminal;

defining, in the protocol stack, mobility-related protocol states corresponding to respective mobility-related messages;

defining, in the protocol stack, mobility-related control protocol states corresponding to respective mobility-related messages;

defining, in the protocol stack, mobility-related public switched telephone network (PSTN) protocol states corresponding to respective mobility-related messages;

performing location registration in accordance with the mobility-related messages and protocol states defined in the protocol stack to begin mobility processing for the mobile subscriber;

performing port assignment registration in accordance with the mobility-related messages and protocol states defined in the protocol stack to continue mobility processing for the mobile subscriber; and performing port cancellation in accordance with the mobility-related messages and protocol states defined in the protocol stack to complete mobility processing for the mobile subscriber.

19. The method according to claim 18, wherein the location registration comprises:

sending a registration request signal to the local exchange; and receiving a registration accept or reject signal from the local exchange in response to the registration request signal.

20. The method according to claim 18, wherein the port assignment registration comprises:

receiving a registration accept signal from the local exchange;

receiving a port assignment signal from the local exchange; and sending a port acknowledgement signal to the local exchange in response to the received port assignment signal.

21. The method according to claim 18, wherein the port cancelling step comprises:

receiving a port cancellation signal from the local exchange; and sending a port cancel acknowledgement signal to the local exchange in response to the port cancellation signal.

22. The method according to claim 18, wherein the location registration comprises:

receiving a registration request signal from the access network;

sending a request signal to the call management module in response to the received registration request;

receiving an acknowledge signal or a reject signal from the call management module in response to the request signal; and sending a registration accept signal or a registration reject signal to the access network in response to the acknowledge or reject signal, respectively.

23. The method according to claim 18, wherein the port assignment registration comprises:

receiving an acknowledge signal from the call management module;

sending a registration accept signal to the access network in response to the acknowledge signal;

sending a port assignment signal to the access network;

receiving a port assignment acknowledge signal from the access network in response to the port assignment signal; and sending a complete signal to the call management module in response to the port assignment acknowledge signal.

24. The method according to claim 18, wherein port cancelling comprises:

receiving a cancel request signal from the call management module;

sending a port cancel signal to the access network in response to the cancel request signal;

receiving a port cancel acknowledgement signal from the access network in response to the port cancel signal; and sending a complete signal to the call management module in response to the port cancel acknowledgement signal.

25. The method according to claim 18, wherein the location registration comprises:

receiving a request signal from the local exchange; and sending an acknowledge signal or a reject signal to the local exchange in response to the request signal.

26. The method according to claim 18, wherein the port assignment registration comprises:

sending an acknowledge signal to the local exchange; and receiving a complete signal from the local exchange upon completion of port assignment registration.

27. The method according to claim 18, wherein port cancelling comprises:

sending a cancel request signal to the local exchange; and receiving a complete signal from the local exchange upon completion of port cancellation.

* * * * *